Nov. 8, 1949 P. NATZLER 2,487,359
APPARATUS FOR MOLDING SLIDE FASTENER SLIDERS
Filed Feb. 12, 1945 3 Sheets-Sheet 1

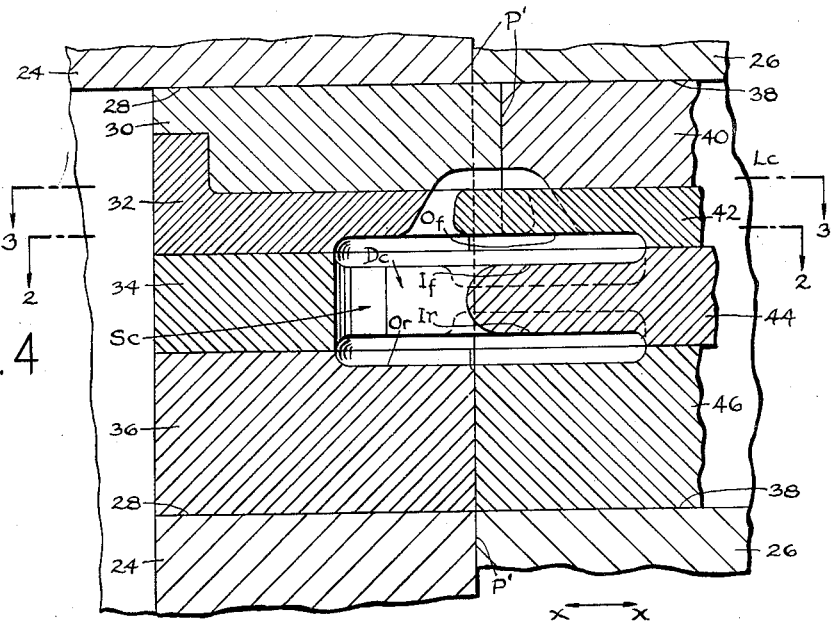

INVENTOR.
PAUL NATZLER
BY
Richard Low
AGENT

Patented Nov. 8, 1949

2,487,359

UNITED STATES PATENT OFFICE 2,487,359

APPARATUS FOR MOLDING SLIDE FASTENER SLIDERS

Paul Natzler, Jackson Heights, N. Y., assignor to Conmar Products Corporation, Newark, N. J., a corporation of New Jersey Application February 12, 1945, Serial No. 577,552

3 Claims. (Cl. 18—42)

This invention relates to apparatus for molding or die casting slide fastener sliders.

A slide fastener slider of the usual type consists of two parallel walls or wings spacedly and centrally united by a wedge-shaped strut at one end and provided with spaced inturned side flanges. The parallel slider walls, their side flanges and the wedge-shaped strut, the latter being frequently referred to as diamond, define a lengthwise extending Y-shaped channel which accommodates two slide fastener halves for their mutual operative engagement and disengagement. At least one slider wall is provided with a lug on its outside, the lug having an orifice for support of a pull tab or pull.

In molding or die casting a slider of the aforesaid type, molds are used which comprise cores or core members for forming interiorly the slider, that is, defining the Y-shaped slider channel and the orifice in the slider lug. It has hitherto been the practice to so construct molds for molding sliders that the movable mold part of a two-part mold is movable in a line different from that in which the cores for defining the slider channel are movable, the mold motion being transversely of the slider cavities in the mold, and the cores for forming the slider channel being independently movable and necessarily longitudinally of the slider cavities, that is, perpendicularly to the mold motion. Such constructions involve a multiple-part mold and are more or less complicated. In some prior mold constructions independently movable cores are also needed to define the orifice in the lug which represents an added complication. True, in one type of prior constructions the orifice in the lug is formed by a core or cores which move in the same line as does the movable mold part and hence are made immovable with respect to the mold, yet the cores for defining the slider channel are also in this case independently movable.

In the molding apparatus disclosed in the copending application of Frederick Ulrich, Ser. No. 512,898, filed December 4, 1943, now Patent No. 2,415,395, the movable mold part of a two-part mold is movable longitudinally of the slider cavities this arrangement making is possible that the cores for defining the slider channel move in the same line as the movable mold part. However, the mold shown in this co-pending application uses independently movable cores for forming the lug orifice, at least as far as conventionally or longitudinally arranged lugs are concerned. Where the co-pending Ulrich application suggests a mold in which no independently movable cores for the lug orifice are needed, the lug extends in an unconventional way or transversely of the slider.

The prime object of my invention is to provide a molding apparatus for slide fastener sliders having at least one conventionally or longitudinally arranged lug, in which apparatus no independently movable cores at all are used. According to the present invention, to form interiorly and exteriorly such sliders a two-part mold, for instance, is used all the cores of which are immovable relatively to the two mold parts.

It is a more specific object of this invention to provide a molding apparatus in which the mold parts meet in a plane or planes substantially transversely of the slider cavities in the mold and in which the mold parts and cores are movable longitudinally of the slider cavities, whereby the cores used include such cores as define the orifice in the lug.

It is another object to provide a molding apparatus the mold of which is so constructed as to comprise cores which define the orifice in the lug at the same time contribute to the formation of the lug.

It is still another object to provide a molding apparatus in which the referred to cores for forming the lug and producing the orifice therein are formed by insert pieces.

To the accomplishment of the foregoing objects and such other objects as may hereinafter appear, my invention relates to a molding apparatus for making slide fastener sliders and the parts thereof as sought to be defined in the appended claims and as described in the following specification taken together with the accompanying drawings, in which:

Fig. 4 is an elevational view taken in cross-section in the plane of the line 4—4 of Fig. 2;

Fig. 5 is an elevational view taken in cross-section approximately in the plane of the line 5—5 of Fig. 2;

Fig. 6 is a section in the planes of the line 6—6 of Fig. 2;

Figure 1:
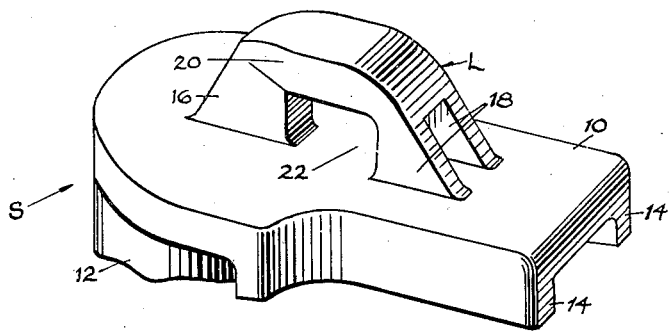
Fig. 1 is a fragmentary isometric view of a slider molded with the molding apparatus of my present invention, this view showing the front half of the slider.

Having first reference to Fig. 1, 10 is one of the two parallel walls or wings of a slide fastener slider generally designated as S, the slider walls tapering toward one end and being spacedly united at the middle of their wide ends by a wedge-shaped strut or diamond 12 only partially shown. The slider wall 10 is provided with side flanges 14 extending toward identical and oppositely directed flanges of the other slider wall, the latter wall and its flanges being not shown. Thus far the construction described is a conventional form of a slider body. The slider wall 10 in accordance with the invention has on its outside a lug L formed by three outwardly projecting posts 16, 18, 18 and a cross bar 20, the posts being provided in staggered relation, and the bar resting on said posts and being integrally connected thereto. The orifice 22 in the lug L defined by the lug portions 16, 18, 18 and 20 serves to receive the pivots of a pull tab or pull not shown. The slider walls, their side flanges and the wedge-shaped diamond define a Y-shaped channel, the convergent branches of the Y being separated by the diamond, and the outline of the Y-shaped channel being indicated in Fig. 2.

The molding apparatus for making the slider S is made to comprise a two-part mold. In the mold selected for illustration in the drawings, which mold may be of a type for producing a plurality of sliders at a time, the mold part 24 is constructed to be stationary, while the mold part 26 is constructed to be movable (see Fig. 4). The two mold parts are movable relatively to each other longitudinally of the slider cavities formed in the mold, the line of this motion being indicated by the double pointed arrows X—X in Figs. 2 and 4, and meet in planes arranged substantially transversely of the slider cavities and indicated by the lines P—P in Figs. 2 and 3 and the lines P'—P' in Figs. 4 and 5.

In the present two-part mold use is made of the conventional construction in which the cavities are formed in a plurality of blocks which are then assembled. Referring to Figs. 4 and 5, each of the mold parts 24 and 26 is most conveniently fashioned as a casing made to receive shaped inserts. The stationary mold part 24 is formed with a recess 28 adapted to receive four inserts 30, 32, 34 and 36 which inserts are held in place by any suitable means such as a backing plate fastened to the mold part 24 as with screws. The movable mold part 26 is formed with a recess 38 adapted to receive a number of inserts such as 40, 42, 44 and 46, these inserts being also suitably held in place. As can be seen in Figs. 4 and 5, each insert is formed with a cavity. The cavities of all of the inserts of each mold part form a sectional cavity, and the two sectional cavities define a slider cavity Sc when the mold sections close. The term "mold section" is used to cover a mold part and all its inserts. Some of the inserts are provided with a core or core member, whereby in general each of the cores or core members of one mold section is matchable with a core or core member of the other mold section. While the outer surfaces of a slider to be molded in the slider cavity Sc, which slider cavity is composed of the cavity for the slider body and the cavity for the slider lug, is formed by inserts, the inner surfaces of a molded slider (Y-shaped slider channel and lug orifice) are formed by cores which are portions of inserts. It will be understood that the inserts 30, 32, 34 and 36 are stationary inasmuch as they are fixed to the stationary mold part, while the opposing inserts are movable, but may be considered immovable relatively to the movable mold part since they are fixed to, and move with, the movable mold part.

With the construction shown, the inserts 36 and 46 mate with each other to define (see particularly Fig. 4) the outer surface Or of the rear portion of the cavity Sc. The insert 34 (see Fig. 2) is provided with two pendent prongs which form core branches 34B, 34B and cooperate with the core plug 44P of the insert 44 to define the inner surfaces Ir and If of the rear portion and front portion, respectively, of the slider cavity and the cavity Dc for the slider diamond. From inspection of Fig. 2 it will also be seen that the insert 44 is flanked by two inserts 48 and 48 which contribute to the formation of the slider cavity. Reverting to Figs. 4 and 5, the inserts 32 and 42 define both interior and exterior portions of the slider cavity and, consequently, act as cores and mold parts proper. They mate with each other to define the outer surface Of of the front portion of the slider cavity and they also mate with the inserts 30 and 40, respectively, to define the cavity Lc for the lug and to form the orifice 22 in the lug of the slider to be molded.

As for the cooperation of those inserts and cores which form interiorly the slider body, a description in greater detail need not be given. The formation of the respective inserts and cores is most clearly shown in the above referred to co-pending application, Ser. No. 512,898.

Figure 7:
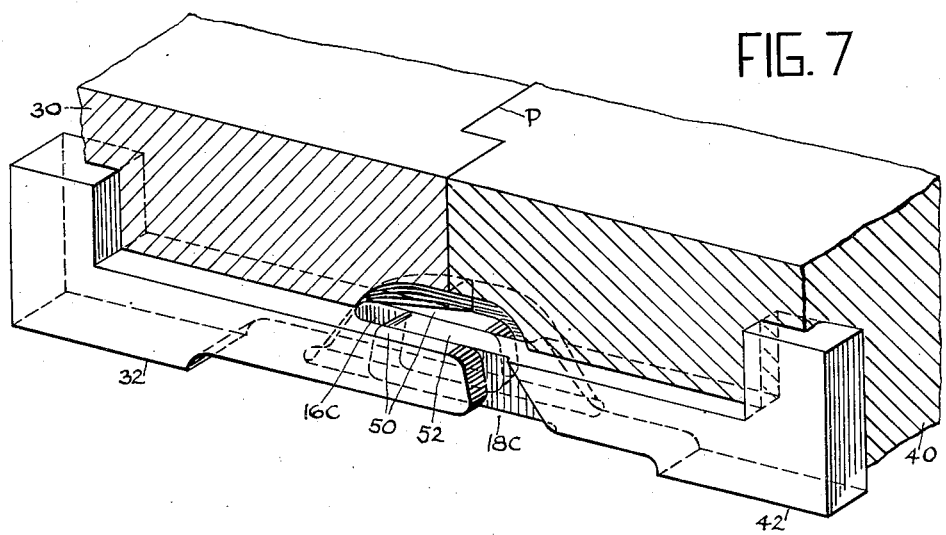
Fig. 7 is a fragmentary isometric view showing slider lug-forming mold inserts in closed or molding position, this view being taken from in front of these inserts.
Figure 8:
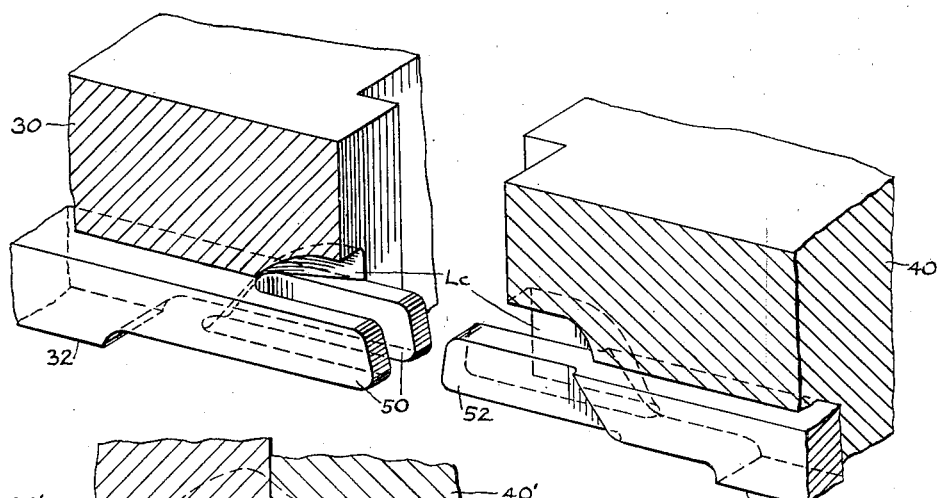
Fig. 8 is a view similar to Fig. 7 showing the inserts separated from each other or in open position.

To carry out the principles of the present invention, the mold is made to comprise the inserts 32 and 42. The insert 32 (see Figs. 2, 7 and 8) terminates in a fork having two core prongs 50, 50, and the insert 42 terminates in a core tongue 52. The tongue 52 moves into the space between and is received between the prongs 50, 50 when the mold sections are closed. While the prongs 50, 50 and the tongue 52 themselves define the cavity 16C for the post 16 of the lug L (see particularly Fig. 2), they cooperate with the insert 40 and the main body of the insert 42 to define the cavities 18C, 18C for the two lug posts 18. It will be understood that the prongs 50, 50 act jointly with the tongue 52 also to produce the orifice 22, said prongs and tongue thus serving as cores. The joint action of the prongs 50, 50 and tongue 52 is also shown in Fig. 6 from which view the cooperation of all the other inserts can also be seen clearly.

Figure 2:
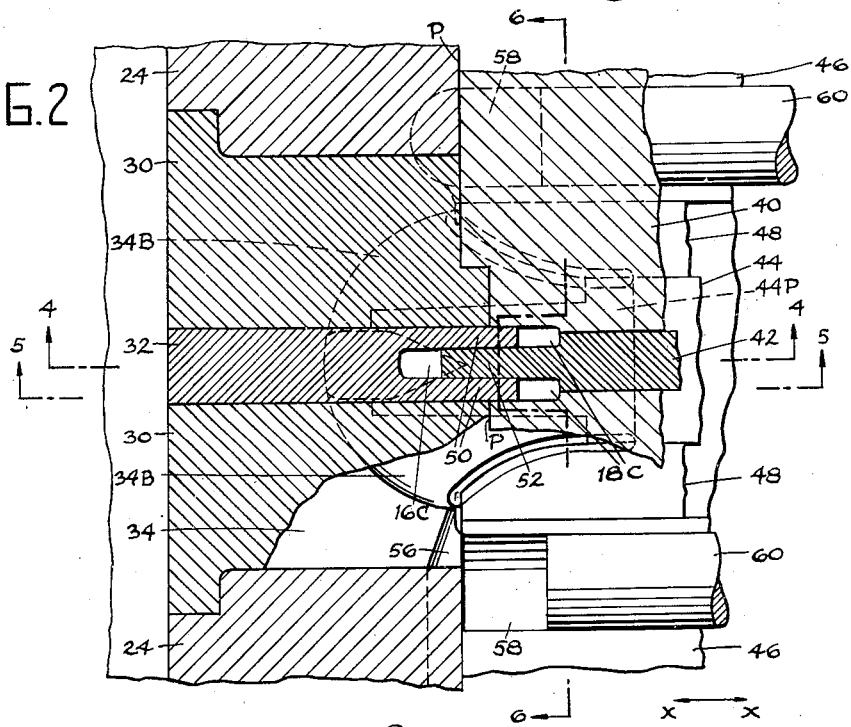
Fig. 2 is a fragmentary plan view, with parts broken away, of a molding apparatus according to this invention, the view illustrating a two-part mold in closed or molding position and being taken in cross section in the plane of the line 2—2 of Fig. 4.
Figure 3:
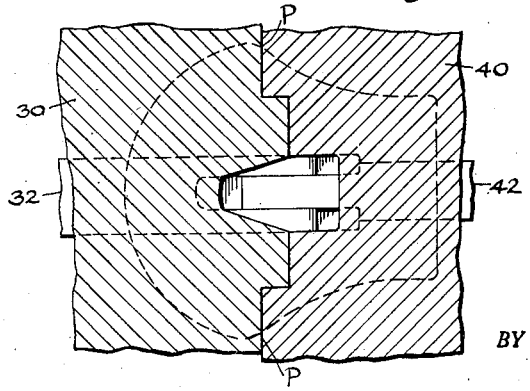
Fig. 3 is a fragmentary plan view taken in cross-section in the plane of the line 3—3 of Fig. 4.

From Figs. 1 and 2, a distinctive feature of the invention will be clear. This feature resides in the staggered arrangement of the lug posts 16, 18, 18 of the molded slider and, consequently, in the side by side engagement of those opposing cores (prongs 50, 50 and tongue 52) contributing to the formation of the lug. Such cores are capable of forming the slider lug interiorly and of forming or helping form the lug exteriorly as well. The lug orifice thus being formed in the molding operation, no subsequent drilling operation or the like is necessary.

Figure 9:
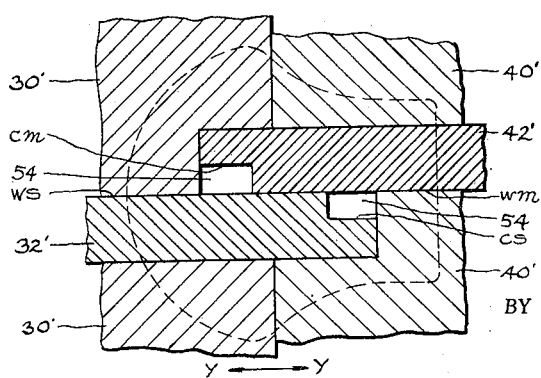
Fig. 9 is a fragmentary plan view of a modification of a two-part mold, the view illustrating modified lug-forming inserts and being taken in cross section through the lug-forming inserts.

Referring now to Fig. 9, while the inserts 30' and 32' pertain to a stationary mold part and correspond to the inserts 30 and 32 of the construction of Figs. 1 to 8, the inserts 40' and 42' pertain to a movable mold part and correspond to the inserts 40 and 42 of the construction described hereinbefore. The mold motion is indicated by the double pointed arrow Y—Y. The inserts 32' and 42', each acting as a core and being defined by front and rear faces and side walls, are in contact along their side walls *ws* and *wm* when the mold is closed. The insert or core 32' has at its free end a cut-out *cs* in the side wall *ws*, and the insert or core 42' has an identical cut-out *cm* in the side wall *wm*. As can be seen from Fig. 9, which view illustrates the closed mold position, the cores 32' and 42' and the inserts 30' and 40' contribute to the formation of cavities 54, 54 for two slider lug posts. It will be obvious that due to the diagonal (or staggered) arrangement of the cavities 54, 54 the cores 32' and 42' are capable of forming the orifice in the slider lug, which according to this construction comprises the two posts formed in the cavities 54, 54 and a bar resting on and integrally connected to these posts.

As thus constructed, no other cores but those pertaining to the movable mold part move. They are immovable relatively to the movable mold part, but move with same. Since all of the cores shown, including the slider lug-defining cores, are secured to the mold parts, it will be clear that the mold sections (mold parts and mold inserts) are brought in closed or open position by merely operating the mold parts. It will be understood that the cores which project from within the mold parts towards (and beyond) the meeting planes of the mold parts, that is, in the line of the mold motion, while they are formed in the present construction by inserts secured to and received in the respective mold parts, might just as well be formed by the mold parts themselves.

A molding apparatus using any of the described mold embodiments can be used for molding or die casting sliders from any suitable molding or die casting material. In molding sliders from resinous materials, such as thermoplastic and thermosetting compounds or mixtures, different methods can be used such as injection molding or transfer molding.

The moldable material is injected through a sprue in the stationary mold part (not shown) and flows through gates provided in the meeting surface of one of the mold parts or in the meeting surfaces of both mold parts to the cavities formed in the mold. In the construction shown in Fig. 2, a gate 56 leads to the slider cavity Sc. The injected material is forced not only into the cavity Sc but also into plug cavities 58, 58. Two knock-out pins 60, 60, which are located in the movable mold part 26 between the inserts 40 and 46 (see Fig. 6) and are actuated by a suitable knock-out mechanism, serve to give a knock-out impulse to the plugs formed in the plug cavities 58, 58 in order to eject the molded slider from the movable mold part.

From the foregoing the structure of the slider of the present invention and the construction and operation of the molding apparatus according to this invention, as well as the many advantages resulting therefrom, will in the main be fully apparent. The slider has a conventionally or longitudinally extending lug and is produced in a two-part mold which is so designed that no independently movable cores are needed to form a pull receiving lug on one or each of the slider walls and to provide orifices in the lugs in the same molding operation. Instead, all of the cores, including those forming slider lugs and providing orifices therein, are movable with the movable mold part.

While I have shown the slider and the molding apparatus in preferred forms, it will be understood that many changes may be made therein without departing from the spirit of the invention defined in the following claims.

I claim:

1. Apparatus for molding a slide fastener slider comprising two parallel walls tapering toward one end and united centrally and spacedly at the wide ends by means of a wedge-shaped strut, said slider walls having spaced inturned side flanges and defining together with said side flanges and strut a substantially longitudinally extending Y-shaped channel, at least one slider half having on its outside a lug extending longitudinally of the slider and comprising transversely staggered posts and a bar resting on and integrally connected to said posts, the posts and bar forming an orifice for a pull tab, said orifice extending substantially transversely of the slider, said molding apparatus including a two-part mold, the mold parts being movable relatively to each other in the line of the longitudinal axes of the mold cavities and meeting on a parting face extending substantially transversely of the longitudinal axis, and at the widest part, of the slider to be molded, and passing through the lug, each mold part being provided with a cavity and fixed cores, the cores projecting from within the respective mold parts in the line of the mold motion beyond the parting face, opposing cavities and cores cooperating in the closed position of the mold parts to form, without any subsequent operation, the slider including its lug, the cores comprising two groups of opposing cores cooperating with each other in side by side engagement, one group helping define said Y-shaped channel, the other group helping define said lug orifice, the Y-shaped channel and orifice extending transversely relatively to each other and the two groups of opposing cores lying in different planes.

2. In the apparatus as defined in claim 1 for molding a slider the lug of which comprises three transversely staggered posts, said one group of opposing cores comprising a core of one mold part fitting between two spaced cores of the other mold part to help define the Y-shaped slider channel, said other group of opposing cores comprising a core of the former mold part fitting between two spaced cores of the latter mold part to help define the lug orifice.

3. In the apparatus as defined in claim 1 for molding a slider the lug of which comprises two diagonally arranged posts, said one group of opposing cores comprising a core of one mold part fitting between two spaced cores of the other mold part to help define the Y-shaped slider channel, said other group of opposing cores comprising two cores, each core having a cut-out at its free end in the side wall contiguous to the other core.

PAUL NATZLER.

(References on following page)

REFERENCES CITED

The following references are of record in the file of this patent:

UNITED STATES PATENTS

| Number | Name | Date |
|---|---|---|
| 1,522,969 | Morand | Jan. 13, 1925 |
| 1,748,250 | Spang | Feb. 25, 1930 |
| 1,897,023 | Schirmer | Feb. 7, 1933 |
| 2,264,144 | Thoresen | Nov. 25, 1941 |
| 2,266,887 | McCoy | Dec. 23, 1941 |
| 2,266,433 | Morin et al. | Dec. 16, 1941 |
| 2,274,060 | Hart | Feb. 24, 1942 |
| 2,349,581 | Marinsky et al. | May 23, 1944 |
| 2,361,782 | Lew | Oct. 31, 1944 |
| 2,367,962 | Reibold et al. | Jan. 23, 1945 |
| 2,374,292 | Kuna | Apr. 24, 1945 |
| 2,415,395 | Ulrich | Feb. 4, 1947 |